United States Patent
Lupo

(10) Patent No.: US 12,525,990 B2
(45) Date of Patent: Jan. 13, 2026

(54) COMMANDS FOR TESTING ERROR CORRECTION IN A MEMORY DEVICE

(71) Applicant: Micron Technology, Inc., Boise, ID (US)

(72) Inventor: Francesco Lupo, Munich (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/897,053

(22) Filed: Aug. 26, 2022

(65) Prior Publication Data

US 2024/0070014 A1 Feb. 29, 2024

(51) Int. Cl.
*H03M 13/01* (2006.01)

(52) U.S. Cl.
CPC ......... *H03M 13/015* (2013.01); *H03M 13/01* (2013.01)

(58) Field of Classification Search
CPC .............................. H03M 13/015; H03M 13/01
See application file for complete search history.

(56) References Cited

U.S. PATENT DOCUMENTS

| | | | |
|---|---|---|---|
| 8,181,100 B1* | 5/2012 | Purdham | G11C 29/02 714/819 |
| 8,707,104 B1* | 4/2014 | Jean | G06F 11/0793 714/6.24 |
| 8,914,687 B2* | 12/2014 | Gold | G06F 11/2215 714/718 |
| 10,558,539 B2* | 2/2020 | Wang | G06F 11/0739 |
| 2003/0066013 A1* | 4/2003 | Maple | G11B 20/1833 |
| 2004/0225932 A1* | 11/2004 | Hoda | H04L 1/241 714/703 |
| 2005/0041553 A1* | 2/2005 | Aizawa | G11C 16/0483 369/59.17 |
| 2009/0276687 A1* | 11/2009 | Kim | H03M 13/451 714/780 |
| 2019/0130991 A1* | 5/2019 | Son | G06F 11/1064 |
| 2019/0164625 A1* | 5/2019 | Park | G11C 29/38 |
| 2019/0188064 A1* | 6/2019 | Ciraula | G11C 29/4401 |
| 2019/0227788 A1* | 7/2019 | Park | G06F 9/4401 |
| 2019/0237151 A1* | 8/2019 | Cho | G11C 29/02 |
| 2022/0283897 A1* | 9/2022 | Yang | G06F 11/1068 |
| 2023/0360713 A1 | 11/2023 | Lupo | |

\* cited by examiner

*Primary Examiner* — Joseph D Torres
(74) *Attorney, Agent, or Firm* — Greenberg Traurig

(57) ABSTRACT

Systems, methods, and apparatus related to error correction in memory devices. In one approach, a memory device uses dedicated op-codes to generate, during programming operations, a pattern including known requested data errors. During reading operations on the memory device, the calibrated errors will be detected by the ECC engine of the memory device as read errors. This permits a host device to observe, in a controlled environment, how the ECC engine behaves and performs in a final manufactured memory product.

25 Claims, 5 Drawing Sheets

COMMANDS FOR TESTING ERROR CORRECTION IN A MEMORY DEVICE

FIELD OF THE TECHNOLOGY

At least some embodiments disclosed herein relate to memory devices in general, and more particularly, but not limited to commands used for testing error correction in a memory device.

BACKGROUND

Various types of volatile and non-volatile memory devices can be used to store data. For example, non-volatile memory devices can include NAND flash memory devices. NAND flash is a type of flash memory constructed using NAND logic gates.

A solid-state drive is an example of a non-volatile data storage device that uses solid-state memory to store data in, for example, non-volatile NAND-based flash memory chips. NAND-based flash memories are generally reliable, but do not store data error-free. In some cases, an error correction code (ECC) is used to correct raw bit errors in the stored data.

Errors in data storage may occur for various reasons. For example, errors may be caused by noise at power rails, voltage threshold disturbances during reading or writing of neighboring cells, and/or retention loss due to leakage within the cells.

Error correction codes are often used in flash memories to recover stored data if an error is detected. In one example, an error correction code supplements user data with parity bits that store additional information so that the data can be recovered if one or more data bits are corrupted. In general, the number of data bit errors that can be corrected in the stored data increases as the number of parity bits in the error correction code increases.

In one example, user data is stored in a memory location of a memory device along with the error correction code for the data. This permits the data and error correction code to be written to the memory location in a single write operation, or read from the memory location in a single read operation. Typically, the error correction code is implemented in a flash memory controller.

In one example, the error correction code generates parity bits that are stored with the user data. In various examples, the error correction code is based on a Hamming coding scheme, a Reed-Solomon coding scheme, a turbo code coding scheme, or a low-density parity check (LDPC) coding scheme.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
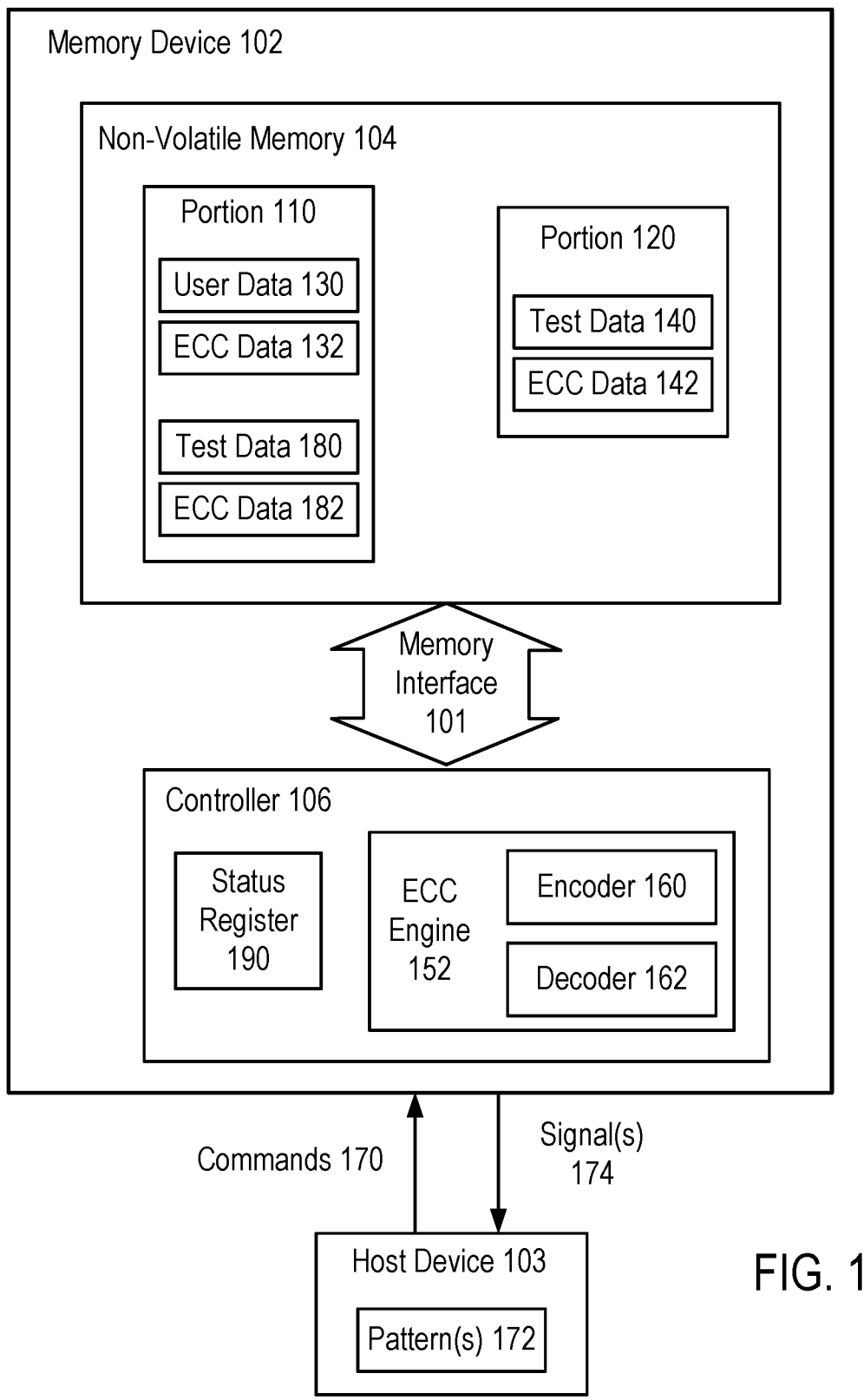
FIG. 1 shows a memory device that receives commands from a host device to cause testing of error correction on the memory device, in accordance with some embodiments.

The following disclosure describes various embodiments for memory devices implementing an architecture that stores data using error correction (e.g., using different code rates for different partitions of a non-volatile memory, or a memory device using different types of memory cells (e.g., SLC, MLC, TLC)). At least some embodiments herein relate to flash memory devices. Embodiments generally can include memory devices of any type that perform error correction for stored data, including volatile memory (e.g., DRAM) and/or non-volatile memory (e.g., flash memory, cross-point memory arrays using chalcogenide memory cells).

At least some embodiments herein relate to data stored in a memory device using an error correction code (ECC) engine (e.g., error correction based on encoding the stored data using parity protection) that can be tested in response to an external signal (e.g., a command from a host device). The memory device may, for example, store data for a host device (e.g., a computing device of an autonomous vehicle, a server, or other computing device that accesses data stored in a memory device). In one example, the memory device is a solid-state drive (SSD) mounted in an electric vehicle.

In one example, a NAND flash memory device stores data (e.g., pages) that is programmed in various modes: an SLC (single level cell) mode, an MLC (multi-level cell) mode, a TLC (triple level cell) mode, or a QLC (quad level cell) mode, etc. When configured in the SLC mode, each memory cell stores one bit of data. When configured in the MLC mode, each memory cell stores two bits of data. When configured in the TLC mode, each memory cell stores three bits of data. When configured in the QLC mode, each memory cell stores four bits of data. When the number of bits stored in a cell increases, the likelihood of errors in the data retrieved from the cell increases.

In many cases, a memory device uses an error correction code (ECC) to detect and/or correct errors in stored data. For example, the usage of an ECC for semiconductor memories is desirable to reduce the bit error rate (BER) during read operations. When an ECC engine takes action to detect and/or correct an error, a signal generated by the memory device alerts a host device by changing its status (e.g., an interrupt signal changes logic states). However, because errors in read operations are very rare events, particularly in SLC flash memory cells, it is difficult or not practical to check the functionality of that signal.

For example, many recent volatile and non-volatile memories incorporate an ECC functionality able to detect and correct possible data reading errors. This is done in order to enhance the ability to read out correct data, even in critical conditions (e.g., high temperatures). In one example, some memories (e.g., flash memory devices) include a dedicated signal (e.g., interrupt signal) designed to provide an active feedback to a host device when the memory detects an internal ECC event and generates interrupt output. The host can take appropriate actions in response to this signal.

In many cases, it is desirable for the user of a memory device (e.g., that is testing the memory device in a validation/debugging phase) to understand how the memory device works when an ECC event occurs on the memory device. However, it is quite complicated and many times not practical to artificially generate such an ECC event, as mentioned above.

For example, for non-volatile memories like NOR and NAND using SLC memory cells, it is relatively difficult to artificially generate reading errors. One reason is the intrinsically native low BER for SLC memory cells. A user might try to build complicated experiments (e.g., inducing the simulated aging of the cells), but this can potentially create unexpected situations. As a result, the experiments do not provide useful data, and/or provide misleading data.

In many cases, a customer that purchases a memory device desires to test the functionality of the memory device, including its error correction functionality. However, as mentioned above, a customer is not able to practically check the functionality of error correcting features on a memory device. This is because it is not practical for a customer to see an actual error (e.g., due to the rarity of such error events). It is also difficult for a customer to try to force an error condition. For example, this can create more errors than the ECC can correct, so that ECC operation cannot be properly tested.

To address these and other technical problems, in one embodiment a memory device uses dedicated op-codes to generate, during programming operations, a pattern including calibrated data errors. In one example, the calibrated error is injection of a single bit error into a known reference pattern. In one example, the op-codes are received from a host device that stores user data in the memory device. In one example, the op-codes are received from a testing device (e.g., a production line tester acting as a host device) that applies various testing and/or validation protocols/tests to the memory device.

During reading operations on the memory device, those calibrated errors will be detected by the ECC engine of the memory device as real read errors. For example, the ECC engine decodes codewords using the same approach for the calibrated error as is used for reading normal user data (e.g., in response to a standard read command received from a host device). This permits, for example, the host device (e.g., host of a memory user or memory product customer) to observe, in a controlled environment, how the ECC engine actually behaves and performs.

In another embodiment that addresses the above technical problems, a memory device has memory to store user data (e.g., by programming into NAND flash memory) for a host device. The memory device includes an error correction code (ECC) engine to generate error correction code (ECC) data for the stored user data. The ECC data provides a capability for correcting at least one error in the user data (e.g., when reading the user data during a read operation).

The memory device further includes a controller to receive, from the host device, a command (e.g., one of the dedicated op-codes described above) requesting at least one error to inject into stored data. In response to receiving the command, the controller generates first data and first ECC data that correspond to the requested error. The first ECC data is generated using the ECC engine. For example, when the first data is decoded using the first ECC data, the ECC engine will detect the injected error.

The controller stores the first data and first ECC data in the memory. For example, the first data and first ECC data are stored in response to receiving a dedicated op-code from a host device that is performing testing (e.g., on a manufacturing line that manufactures the memory device). After completion of storing the first data and first ECC data, the controller performs a read operation to read the first data and the first ECC data from the memory. The read operation is performed in the same manner as done for normal user data (e.g., a standard read operation).

The controller performs, using the ECC engine, error correction for the first data read from the memory. The error correction uses the first ECC data to detect the requested error. The ECC engine operates in the same manner as used for reading normally-stored user data. Then, the controller signals the host device to indicate detection of the requested error. In one example, the signal is an interrupt signal as described above.

Various advantages are provided by at least some embodiments described herein. In one example, allowing a user to write a pattern including calibrated errors helps to test the ECC engine and verify that an ECC event signal generated by the memory device is effectively generated. In one example, providing a customer with the ability to generate calibrated errors results in a more controlled and repetitive situation that improves confidence in testing results. In one example, a memory manufacturer is able to check, during testing of the memory device, the effectiveness of the ECC functionality.

In another example, to check ECC effectiveness, by providing a user with the ability to generate calibrated errors in a more controlled and repetitive situation, the debugging process is easier to perform. In one example, a customer using a host device can verify the behavior of the signal generated by the memory device to alert the host during ECC events. In one example, this is desirable for the safety-related analysis of the memory device on a final application (e.g., use in a critical automotive system such as a braking or steering system).

FIG. 1 shows a memory device 102 that receives commands 170 from a host device 103 to cause testing of error correction on memory device 102, in accordance with some embodiments. Results from and/or other data regarding the testing are provided to host device 103 using one or more signals 174. In one example, a signal 174 is an interrupt signal generated by controller 106 in response to an ECC event on memory device 102.

In one example, the ECC event is detection of at least one error in data read from memory 104 during a read operation. In one example, test data 180 and/or test data 140 is stored and then read to test operation of ECC engine 152. Signal 174 is sent to host device 103 in response to detection of an error when reading test data 180 and/or test data 140. In one embodiment, one or more signals 174 indicate a number of errors detected and/or a number of error corrected.

In one embodiment, the storing and reading of test data 140, 180 is initiated by host device 103 sending one or more commands 170 to controller 106. In one example, command 170 requests the injection of a single error into stored data. In response to receiving command 170, controller 106 stores test data 140 and/or 180 so that the test data includes the requested single error. The corresponding ECC data 142, 182 is generated on the test data prior to injecting the error. This is so that ECC engine 152 will detect the injected error during the read operation. The error is injected intentionally for purposes of testing. For example, reading the test data will allow observation of ECC engine 152 operation in handling errors, such as for example discussed above. Host device 103 can, for example, take responsive actions based on signal(s) 174, such as for example discussed above. In one example, host device 103 disables a memory location, or refreshes content in a memory location.

In one embodiment, controller 106 selects the pattern used for test data. In one embodiment, host device selects one or more patterns 172 that will be used by controller 106 for generating test data.

In one example, pattern 172 is received by controller 106 from host device 103. Controller 106 generates ECC data 182 based on pattern 172. Then, an error as requested by host device 103 is injected into pattern 172 to provide test data 180. Test data 180 and ECC data 182 are programmed into portion 110. When controller 106 reads test data 180 and performs error correction using ECC data 182, the requested error is detected by ECC engine 152. In some cases, the detected error is also corrected by ECC engine 152. Signal (s) 174 are sent to host device 103 based on the detection and/or correction. A similar storing and reading operation can be done for test data 140 and ECC data 142 stored in portion 120.

In one embodiment, the storing and reading of test data as described above is performed based on commands 170. In one example, one of commands 170 can request a single error. In one example, one of commands 170 can request a dual error. In one example, one of commands 170 can request storing and reading of test data without any injected error. This provides an error-free test read operation that can be used as a reference by host device 103. In general, host device 103 can use any of a dedicated set of commands 170, each command causing a particular defined testing operation.

During testing, controller 106 updates status register 190 to store a current status of a testing operation (e.g., including programming, encoding, decoding, and/or reading). In one example, a bit in register 190 can be read by host device 103 to determine when a testing operation is complete (e.g., a testing operation being performed based on a most recent command 170).

In one embodiment, the ECC functionality is enabled on a codeword basis and a codeword is the minimum granularity of data for ECC management. The codeword is typically smaller than the program page. For example, if the programming page is 256 byte-aligned, each page consists of 16 codewords 16 byte-aligned. The commands 170 dedicated to program a pattern with calibrated errors are based on a codeword.

In one example, for the case of an ECC engine 152 able to correct one error and to detect two errors, the following set of commands 170 are available for use by host device 103:

an op-code to program a codeword with a single error injected an op-code to program a codeword with a dual error injected an op-code to program a codeword error-free (e.g., "certified good", and/or to be used as reference)

In one example, an implementation of memory device 102 emulates the command used by controller 106 to perform standard or normal programming operations (e.g., standard read and write operations for normal user data stored by host device 103, but working on a codeword base, as discussed above). In one example, the input program buffer (not shown) (see, e.g., input buffer 370 of FIG. 2) is filled (e.g., to avoid sending a command 170 with a number of bytes to be programmed smaller than the codeword dimension).

In one example, the new programming op-codes (e.g., commands 170) are enabled as Extended Function Interface (EFI) commands, such as in the following exemplary flow:
 lower Select #signal
 9Bh (EFI command code))
 XXh (different sub op-codes that are identified in order to program the codeword injecting one error, two errors, or no errors, depending on the particular op-code)
 3-Byte (or 4-Byte) address
 32 Bytes of data to be programmed
 raise Select #signal to start the programming operation The completion of the operation (e.g., programming of test data 140 or 180) can be monitored using various mechanisms (e.g., polling a flag status register 190). In case of one or more errors, one or more flags in status register 190 can be generated.

In one embodiment, user data 130 is programmed into a user area in a memory array of memory 104, and ECC data 132 is programmed into an ECC area. Test data 180 is programmed into the same user area, and ECC data 182 is programmed into the same ECC area.

In one example, when writing, ECC engine 152 generates the ECC data and programs the user or test data and the corresponding ECC data. When reading, ECC engine 152 generates ECC data from the user area and compares the data obtained with the ECC data written in the ECC area. If there is a perfect match, the read data is error-free. In the case of less than a perfect match in the data read, error(s) can be present. Depending on the ECC capability, the error(s) will be corrected and/or detected.

In one example, the ECC data is read and checked across the user or test data to enable an ECC algorithm of ECC engine 152 to find and correct any 1-bit error within a 16-byte page. Each 16-byte page (128 bits) has 8 ECC parity bits. The 16-byte page is an example of a codeword.

In one example, signal 174 is an interrupt signal (e.g., INT #). The interrupt signal provides active feedback when a flash memory device detects an internal ECC event and generates interrupt output so a host device can take appropriate actions.

In one example, when the memory device 102 is selected for a main array read operation, an internal ECC engine 152 monitors and actively generates interrupt events based on option configurations. Each interrupt event is generated for a specific codeword associated with the occurring ECC event. Interrupt events can be generated based on one specific event or any of a number of events (e.g., two events: 1-bit correction and 2-bit detection capability) configurable by a user (e.g., using host device 103 and/or a user interface of memory device 102).

In one embodiment, memory device 102 can store data (e.g., user data 130 and test data 140, 180) in different portions (e.g., portions 110, 120) of non-volatile memory 104 using error correction (e.g., at a same or at different code rates). Memory device 102 is, for example, an SSD or other storage device, or a NAND-based flash memory chip or module that encodes stored data using one or more levels of parity data.

Controller 106 controls access to non-volatile memory 104. For example, user data 130 is provided by controller 106 to non-volatile memory 104 over memory interface 101. Controller 106 includes ECC engine 152 for generating ECC data (e.g., when writing data) using encoder 160, and for decoding ECC data (e.g., when reading data) using decoder 162.

During normal operation, memory device 102 receives user data to be stored from host device 103 (e.g., over a serial or parallel communications interface, or a wireless communications interface). Memory device 102 stores the received data in memory cells (not shown) of non-volatile memory 104. In one example, the memory cells (e.g., SLC memory cells) may be provided by one or more non-volatile memory chips. In one example, the memory chips are NAND-based flash memory chips.

Memory device 102 implements error correction by generating ECC data (e.g., ECC data 132 using user data 130). In some cases, the ECC data for selected data can have a higher error correction capability than ECC data for other data. In one example, as user data 130 is received from host device 103, the received data is encoded using encoder 160 to provide ECC data 132 (e.g., parity bits). Controller 106 can implement error correction in hardware and/or software. In one example, the user data 130 is video data from a mobile device of a user, or sensor data from one or more sensors of an autonomous or other vehicle.

As incoming user data 130 is received from host device 103, user data 130 is stored in portion 110 (e.g., a partition of memory 104) along with ECC data 132 that has been generated by encoder 160. In one example, portion 110 includes SLC or TLC blocks.

In one embodiment, ECC data may be stored in various locations. In some examples, ECC data 150 may be stored in local memory of controller 106 and/or memory of host device 103. In some embodiments, error correction using ECC data may be performed by controller 106 and/or host device 103.

In one example, for safety-related analysis it is desirable to inform a host microprocessor (e.g., host device 103 using signal 174) of an error (e.g., an ECC event), even if the error is corrected by a memory device used by the host. The error may indicate an increased chance of future errors that are not correctable by the memory device such that the host assesses potential actions to take. For example, the host can adjust operation based on error signaling from a memory device in an automotive implementation.

In one example, memory device 102 has SLC memory cells that are programmed and erased. Sometimes, errors may occur between storing data into memory cells (e.g., SLC memory cells used as storage media in non-volatile memory chips of an SSD) and retrieving data from memory cells. To facilitate the retrieval of error-free data, a controller 106 (e.g., used in the SSD) can encode data received from a host device using an error correction code (ECC), such as a low-density parity-check (LDPC) code, and store the encoded data in the memory cells. Decoding the encoded data retrieved from the memory cells can remove or reduce errors.

In one example, the ECC is additional information added to user data (e.g., user data 130) that permits correction of errors (e.g., the addition of 10% or 20% of parity bits or data to the user data). The additional information is used by error correction code (ECC) engine 152 (e.g., encoder 160 and decoder 162 implemented in a controller of an SSD).

In one example, data is read from SLC blocks in one or more NAND dies to a controller (e.g., ASIC), errors are corrected using parity data stored in the SLC blocks, then the data is written back to QLC blocks in the NAND dies.

In one example, SLC blocks for a first partition (e.g., portion 110) use error correction for user data with 20% parity data, and QLC blocks for a second partition (e.g., portion 120) use error correction for the user data with 10% parity data.

In one example, incoming user or test data is initially stored in single-level cell (SLC) flash memory at a smaller code rate (e.g., 0.8 for 20% parity data), and then copied to and stored in quad-level cell (QLC) flash memory at a larger code rate (e.g., 0.9 for 10% parity data). The parity data for the user data is generated using two-level encoding and includes first ECC data (ECC1) corresponding to a first level, and second ECC data (ECC2) corresponding to a second level (that provides greater error correction than the first level).

This is useful, for example, for correcting errors for data stored in an input buffer or other memory region (e.g., SLC block) used to receive incoming user data. The input buffer can sometimes exhibit higher error rates than other regions of a memory (e.g., due to excessive wear). Having a higher error correction capability for the SLC region enables the system to do more program/erase operations on the SLC region. The second ECC data provides a greater error correction capability to satisfy the greater error correction needs of the input buffer or region.

In one example, a NAND flash memory device includes non-volatile memory (e.g., on one or more NAND die) and a controller (e.g., an ASIC). The non-volatile memory has a first partition (e.g., an SLC block) and a second partition (e.g., a QLC block). The first partition is configured to store data in memory cells each storing a single bit of data, and the second partition is configured to store data in memory cells each storing two or more bits of data.

In one embodiment, error handling and/or testing (e.g., generating test data 180) can be initiated by a controller (e.g., controller 106) and/or host device (e.g., host device 103) based on determining a context associated with the non-volatile memory that is storing the user data. For example, the error handling can be initiated based on a determination of a temperature or a change in temperature of the memory and/or an environment in which the memory is located. For example, the error handling and/or testing can be initiated based on a determination of an error rate associated with the stored user data in an SLC block. For example, the error handling and/or testing can be initiated based on a time period for which the user data has been stored in an SLC block.

In one example, the error handling and/or testing can be initiated based on an extent of prior usage of an SLC block in portion 110. The prior usage may be determined based on, for example, a counter that counts a number of program-erase cycles performed on memory cells in the SLC block.

In one embodiment, an error correction architecture for a memory device generates some modularity in codeword construction such that part of the ECC bytes written to an SLC page can be truncated and yet be ECC correctable. Two levels of encoding are used. A corresponding parity check matrix (e.g., an H matrix which generates the parity bits for the ECC) is generated accordingly. In a way, the parity check matrix for 20% code (e.g., Ĥ matrix) uses the H matrix for 10% code. The memory device generates 10% parity in a first step (ECC1) (e.g., for 0.9 rate code), and then using this information the memory device generates an additional 10% parity (ECC2) (e.g., for 0.8 rate code).

Figure 2:
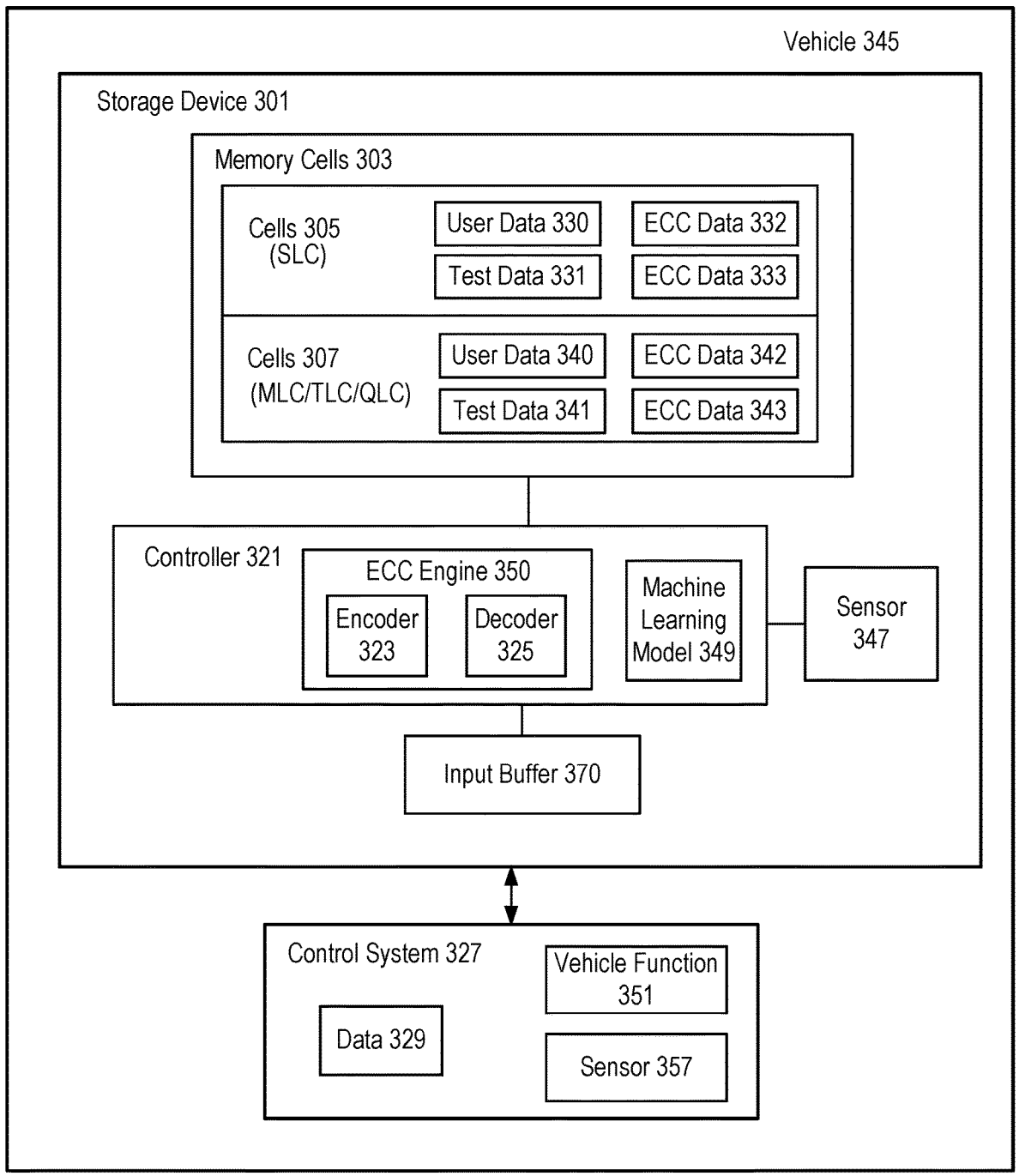
FIG. 2 shows a storage device that stores data for a control system of a vehicle and permits testing by the control system of internal error correction performed in the storage device, in accordance with some embodiments.

FIG. 2 shows a storage device 301 that stores data for a control system 327 of a vehicle 345 and permits testing by control system 327 of internal error correction performed in storage device 301, in accordance with some embodiments. The internal error correction is provided by ECC engine 350, which includes encoder 323 and decoder 325. Storage device 301 is an example of memory device 102. Control system 327 is an example of host device 103.

Control system 327 controls various vehicle functions 351 of vehicle 345. In one example, vehicle functions 351 include motor control, navigation control, and/or control of other hardware of vehicle 345 that performs operational functions when vehicle 345 is being used by an operator (e.g., a driver or passenger). Control system 327 stores data 329 that is used in controlling vehicle function 351.

Control system 327 can send at least portions of data 329 to storage device 301 for storage in memory cells 303. Controller 321 manages storage of data in storage device 301. For example, a portion of data 329 is sent as user data 330, which is received by controller 321 from control system 327 and stored in memory cells 303. For example, user data 330 is encoded to generate ECC data 332 to provide parity data.

User data 330 is stored in input buffer 370 as it is received from control system 327. Controller 321 uses encoder 323 to generate ECC data 332 using the user data 330 in input buffer 370. Then, user data 330 and ECC data 332 are stored in memory cells 305 operating in an SLC mode.

In one embodiment, storage device 301 can store data for control system 327 of vehicle 345 using two-level error correction coding. A first level of error correction coding is provided by using ECC1 data, and a second level of error correction coding is provided by using ECC2 data (e.g., ECC data 332 can include both ECC1 data and ECC2 data).

Controller 321 determines the type of memory cells to use for storing data. For example, controller 321 can store user data 340 in memory cells 307 (operating in MLC/TLC/QLC mode). ECC engine 350 generates ECC data 342 for user data 340. Controller 321 can perform error correction using decoder 325 when reading data from memory cells 307.

In one embodiment, control system 327 can initiate testing of ECC engine 350 similarly as described above for FIG. 1. Control system 327 can send one or more commands (e.g., commands 170) to storage device 301. In response to receiving the command, controller 321 generates test data 331 and corresponding ECC data 333. Test data 331 is an example of test data 180, and ECC data 333 is an example of ECC data 182.

In one embodiment, when performing testing of ECC engine 350, controller 321 determines the type of memory cell in which to store test data. In one example, controller 321 determines to store data in memory cells operating in a TLC mode. In response to receiving a command from control system 327, controller 321 generates test data 341 and corresponding ECC data 343 to store in memory cells 307. When test data 341 is read from cells 307, and error correction is performed using ECC data 343, ECC engine 350 will detect the error injected by controller 321 in response to the command from control system 327.

In one embodiment, controller 321 determines a temperature of storage device 301 using sensor 347 (e.g., a sensor embedded in a memory array). Signaling provided by sensor 347 is used by controller 321 as input to machine learning model 349 (e.g., an artificial neural network). An output from machine learning model 349 is used for operating storage device 301. Based at least in part on this output, controller 321 determines how to manage user data stored in memory cells 303 and/or how to perform testing of ECC engine 350 using injected errors (e.g., as described for FIG. 1). In an alternative embodiment, controller 321 is able to initiate testing of ECC engine 350 using injected errors without requiring a command from control system 327 or any other external host device.

In one example, controller 321 uses an output from machine learning model 349 to decide whether to store test data in cells 305 (e.g., operating in SLC mode) or cells 307 (e.g., operating in MLC/TCL/QLC mode). In one example, output from machine learning model 349 can be used as a basis and/or trigger for performing error correction for user data 330 stored in cells 305.

Controller 321 can include a timer (not shown) used for determining a time period that user data 330 is stored in cells 305, 307. The time period can be used by controller 321 in determining whether to initiate and/or how to perform testing of ECC engine 350. In one example, when the time period is greater than the threshold, controller 321 decides to perform testing by generating and storing test data and corresponding ECC data.

Control system 327 includes sensor 357 (e.g., a sensor mounted on a hardware component of vehicle 345). Data from sensor 357 can include temperature data and/or other data, and can be provided to controller 321. The data from sensor 357 can be used by controller 321 in deciding how to manage user data 330 (e.g., whether to perform error correction of user data 330), and/or whether to perform a testing operation of ECC engine 350 using test data (e.g., as described above for ECC engine 152).

Figure 3:
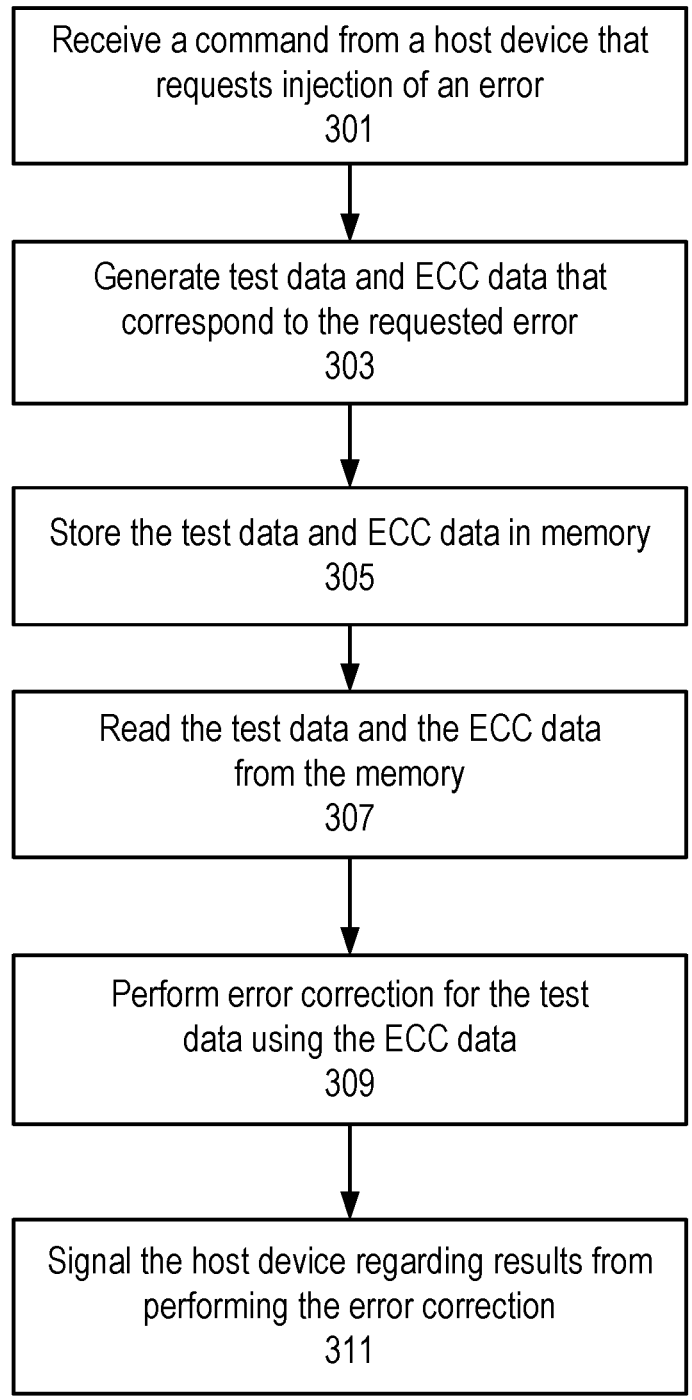
FIG. 3 shows a method using commands sent by a host device to initiate testing of error correction in a memory device, in accordance with some embodiments.

FIG. 3 shows a method using commands sent by a host device to initiate testing of error correction in a memory device, in accordance with some embodiments. For example, the method of FIG. 3 can be implemented in the system of FIG. 1.

The method of FIG. 3 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 3 is performed at least in part by one or more processing devices (e.g., controller 106 of FIG. 1).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 301, a command is received from a host device that requests injection of an error. In one example, controller 106 receives a command 170 from host device 103. The command 170 requests injection of a one bit error into a codeword.

At block 303, test data and ECC data are generated to correspond to the requested error. In one example, test data 180 is derived from an error-free pattern 172 received from host device 103. Controller 106 injects a single bit error into error-free pattern 172 to provide test data 180 (having the injected single bit error). ECC engine 152 generates ECC data 182 based on error-free pattern 172.

At block 305, test data and ECC data are stored in the memory. In one example, controller 106 stores test data 180 and ECC data 182 in memory 104.

At block 307, the test data and the ECC data are read from the memory. In one example, after test data 180 and ECC data 182 have been programmed into memory 104, controller 106 reads test data 180 and ECC data 182 using a standard read operation. In one example, this read operation emulates read operations used by controller 106 to store user data 130.

At block 309, error correction is performed for the test data using the ECC data. In one example, ECC engine 152 decodes test data 180 using ECC data 182. ECC engine 152 detects the single bit error that was injected by controller 106 in response to receiving command 170.

At block 311, the host device is signaled regarding results from performing the error correction. In one example, controller 106 sends signals 174 to host device 103. In one example, signals 174 include an interrupt signal that indicates occurrence of an ECC event when reading test data 180.

In one embodiment, a system comprises: memory (e.g., non-volatile memory 104) configured to store user data (e.g., 130) for a host device (e.g., 103); an error correction code (ECC) engine (e.g., 152) configured to generate error correction code (ECC) data (e.g., 132) for the stored user data, wherein the ECC data provides a capability for correcting at least one error in the user data; and a controller (e.g., 106) configured to: receive, from the host device, a command (e.g., 170) requesting at least one error to inject into stored data; in response to receiving the command, generate first data (e.g., 180) and first ECC data (e.g., 182) that correspond to the requested error, wherein the first ECC data is generated using the ECC engine; store the first data and first ECC data in the memory; read the first data and the first ECC data from the memory; perform, using the ECC engine, error correction for the first data read from the memory, the error correction using the first ECC data to detect the requested error; and signal (e.g., one or more signals 174) the host device to indicate detection of the requested error.

In one embodiment, the first data is a codeword, and the requested error is at least one error injected into the codeword.

In one embodiment, the command is a programming operation code (e.g., an op-code in an Extended Function Interface (EFI) command set).

In one embodiment, the signaling further indicates a number of errors that are detected or corrected by the ECC engine.

In one embodiment, generating the first data and the first ECC data comprises: generating the first ECC data to match second data (e.g., 00001111); and after generating the first ECC data, injecting the requested error into the second data to provide the first data (e.g., a one-bit error injected by changing the last bit of the second data to provide first data of 00001110, so that the stored first data contains the requested one-bit error).

In one embodiment, the second data is a codeword received from the host device.

In one embodiment, injecting the requested error comprises changing one or more bits of the second data so that the stored first data does not match the stored first ECC data.

In one embodiment, the ECC engine comprises an encoder and a decoder.

In one embodiment, the memory includes at least one of volatile memory or non-volatile memory.

In one embodiment, the controller is further configured to: receive a write command (e.g., a standard write command) from the host device; store first user data (e.g., user data 130) in the memory in response to receiving the write command; read the first user data; perform, using the ECC engine, error correction for the first user data; and signal the host device to indicate a result from performing the error correction for the first user data.

In one embodiment, the first user data is stored in a first portion (e.g., 110) of the memory, the first data is stored in a second portion (e.g., 120) of the memory, and the second portion does not store any user data received from the host device.

In one embodiment, the memory is configured in a storage device (e.g., 301) of a vehicle (e.g., 345); and the storage device has an input buffer (e.g., 370) configured to receive, from a control system of the vehicle, user data for programming into the memory.

In one embodiment, the command is a test command; the controller is further configured to operate in a standard mode or a test mode; receiving a read or write command (e.g., a write command used to program user data 130) associated with user data from the host device causes the controller to operate in the standard mode; and receiving the test command (e.g., command 170) causes the controller to operate in the test mode.

In one embodiment, the system further comprises a status register (e.g., 190), wherein the status register is configured for access by the host device to determine: when in the standard mode, a status of a read or write operation for user data received from the host device; or when in the test mode, a status of at least one of storing the first data, reading the first data, or performing error correction for the first data.

In one embodiment, the host device is configured to, in response to the signaling, perform at least one of disabling a location in the memory (e.g., disable further storage of user data in portion 110), or refreshing content of at least a portion of the memory (e.g., refresh user data stored in portion 110).

In one embodiment, the command is a first command (e.g., 170), and the controller is further configured to: receive, from the host device, a second command requesting storing of second data without injecting an error (e.g., the second data is received from the host device or generated by the controller); in response to receiving the second command, generate second ECC data for the second data using the ECC engine; store the second data and second ECC data in the memory, wherein the second data is stored without injecting an error; read the second data and the second ECC data from the memory; perform, using the ECC engine, error correction for the second data read from the memory, the error correction using the second ECC data; and signal the host device regarding the error correction for the second data.

In one embodiment, the memory is configured in a memory device; storing the first data and reading the first data emulate operations performed by the memory device in response to receiving standard program and read commands from the host device; the standard program command is used to program user data (e.g., user data 130) of the host device; the standard read command is used to read user data of the host device.

In one embodiment, a system comprises: memory; an error correction code (ECC) engine; and a controller configured to: receive, from a host device, a command requesting at least one error to inject into data programmed in the memory; in response to receiving the command, store and read first data, wherein: storing the first data comprises generating, based on the requested error and using the ECC engine, the first data and first ECC data, and programming the first data and first ECC data in the memory; and reading the first data comprises reading the first data and the first ECC data from the memory, and performing, using the ECC engine and the first ECC data, error correction for the first data read from the memory; and signal the host device regarding the error correction.

In one embodiment, the command is only used when testing the ECC engine (e.g., the command is a dedicated op-code), the requested error is at least one calibrated error (e.g., a single bit error), and the first data is based on a pattern (e.g., pattern 172) received from the host device.

In one embodiment, the signaling includes at least one of an interrupt signal, or an indication of an event associated with the error correction.

In one embodiment, the host device is configured to verify that the signaling corresponds to the requested error.

In one embodiment, the command is one of a set of commands dedicated to verification of error correction operation, and the set of commands (e.g., Extended Function Interface (EFI) commands) includes a first command for requesting injection of a first error type (e.g., a single error), and a second command for requesting injection of a second error type (e.g., a dual error).

In one embodiment, the set of commands further includes a third command for requesting an error-free programming of second data in the memory.

In one embodiment, the second data is read from the memory; error correction is performed by the ECC engine for the second data; and a behavior of the error correction for the first data is compared to a behavior of the error correction for the second data (e.g., comparison can be performed by controller and/or host device).

In one embodiment, the controller is further configured to: receive, from the host device, an address associated with the command, and data (e.g., a codeword or a page) to be programmed in the memory.

In one embodiment, the data to be programmed in the memory is the first data.

In one embodiment, the data to be programmed in the memory is a pattern (e.g., pattern 172 from host device 103), and the first data is generated by modifying the pattern (e.g., modify a pattern of bits to change one or more bits so an error is injected into the pattern and there will be a parity mismatch with ECC data).

In one embodiment, performing the error correction for the first data comprises: generating new ECC data from the first data read from the memory; comparing the new ECC data with the first ECC data; and determining whether the new ECC data and the first ECC data match.

In one embodiment, a method comprises: receiving, from a host device, a command requesting at least one error; in response to receiving the command, generating first data and first ECC data that correspond to the requested error; storing the first data and first ECC data in memory; reading the first data and the first ECC data from the memory; performing error correction for the first data read from the memory, the error correction using the first ECC data to detect the requested error; and signaling the host device regarding the error correction.

Figure 4:
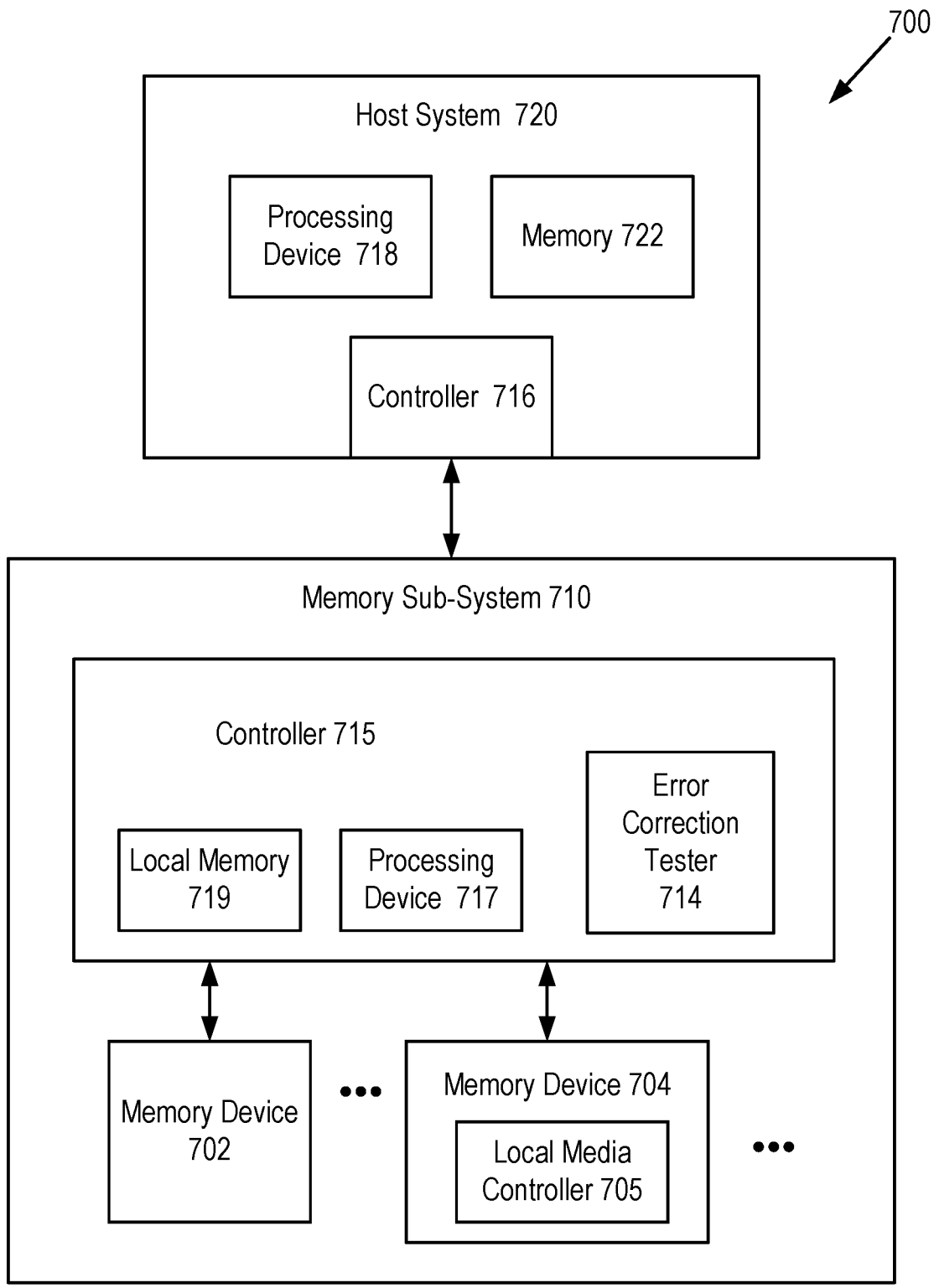
FIG. 4 shows an example computing system that includes a memory sub-system in accordance with some embodiments of the present disclosure.

FIG. 4 shows an example computing system that includes a memory sub-system in accordance with some embodiments of the present disclosure. In some embodiments, testing error correction of a memory device is performed as described above. For example, test data and ECC data are stored in portion 110 and/or 120, as discussed above, for testing ECC engine 152.

In one example, a memory sub-system can be a storage device (e.g., storage device 301), a memory module, or a hybrid of a storage device and memory module. Examples of storage devices and memory modules are described below in conjunction with FIG. 4. In general, a host system can utilize a memory sub-system that includes one or more components, such as memory devices that store data. The host system can provide data to be stored at the memory sub-system, and can request data to be retrieved from the memory sub-system.

FIG. 4 illustrates an example computing system 700 that includes memory sub-system 710 in accordance with some embodiments of the present disclosure. The memory sub-system 710 can include media, such as one or more volatile memory devices (e.g., memory device 702), one or more non-volatile memory devices (e.g., memory device 704), or a combination of such. Memory device 102 of FIG. 1 is an example of memory sub-system 710, and host device 103 is an example of host system 720.

A memory sub-system 710 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 700 can be, for example, a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 700 can include a host system 720 that is coupled to one or more memory sub-systems 710. FIG. 4 illustrates one example of a host system 720 coupled to one memory sub-system 710.

The host system 720 can include a processor chipset (e.g., processing device 718) and a software stack executed by the processor chipset. The processor chipset can include one or more cores, one or more caches, a memory controller (e.g., controller 716) (e.g., NVDIMM controller), and a storage protocol controller (e.g., PCIe controller, SATA controller). The host system 720 uses the memory sub-system 710, for example, to write data to the memory sub-system 710 and read data from the memory sub-system 710.

The host system 720 can be coupled to the memory sub-system 710 via a physical host interface. Examples of a physical host interface include, but are not limited to, a Serial Advanced Technology Attachment (SATA) interface, a Peripheral Component Interconnect Express (PCIe) interface, Universal Serial Bus (USB) interface, Fibre Channel, Serial Attached SCSI (SAS), a Double Data Rate (DDR) memory bus, Small Computer System Interface (SCSI), a Dual In-line Memory Module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 720 and the memory sub-system 710. The host system 720 can further utilize an NVM Express (NVMe) interface to access components (e.g., memory devices 704) when the memory sub-system 710 is coupled with the host system 720 by the PCIe interface. The physical host interface can provide an interface for passing control, address, data, and other signals between the memory sub-system 710 and the host system 720. FIG. 4 illustrates a memory sub-system 710 as an example. In general, the host system 720 can access multiple memory sub-systems via a same communication connection, multiple separate communication connections, and/or a combination of communication connections.

The processing device 718 of the host system 720 can be, for example, a microprocessor, a central processing unit (CPU), a processing core of a processor, an execution unit, etc. In some instances, the controller 716 can be referred to as a memory controller, a memory management unit, and/or an initiator. In one example, the controller 716 controls the communications over a bus coupled between the host system 720 and the memory sub-system 710. In general, the controller 716 can send commands or requests to the memory sub-system 710 for desired access to memory devices 702, 704. The controller 716 can further include interface circuitry to communicate with the memory sub-system 710. The interface circuitry can convert responses received from memory sub-system 710 into information for the host system 720.

The controller 716 of the host system 720 can communicate with controller 715 of the memory sub-system 710 to perform operations such as reading data, writing data, or erasing data at the memory devices 702, 704 and other such operations. In some instances, the controller 716 is integrated within the same package of the processing device 718. In other instances, the controller 716 is separate from the package of the processing device 718. The controller 716 and/or the processing device 718 can include hardware such as one or more integrated circuits (ICs) and/or discrete components, a buffer memory, a cache memory, or a combination thereof. The controller 716 and/or the processing device 718 can be a microcontroller, special purpose logic circuitry (e.g., a Field Programmable Gate Array (FPGA), an Application Specific Integrated Circuit (ASIC), etc.), or another suitable processor.

The memory devices 702, 704 can include any combination of the different types of non-volatile memory components and/or volatile memory components. The volatile memory devices (e.g., memory device 702) can be, but are not limited to, Random Access Memory (RAM), such as Dynamic Random Access Memory (DRAM) and Synchronous Dynamic Random Access Memory (SDRAM).

Some examples of non-volatile memory components include a Negative-AND (NAND) type flash memory and write-in-place memory, such as three-dimensional cross point memory. A cross point array of non-volatile memory can perform bit storage based on a change of bulk resistance, in conjunction with a stackable cross-gridded data access array. Additionally, in contrast to many flash-based memories, cross point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 704 can include one or more arrays of memory cells (e.g., memory cells 303 of FIG. 2). One type of memory cell, for example, Single Level Cells (SLCs) can store one bit per cell. Other types of memory cells, such as Multi-Level Cells (MLCs), Triple Level Cells (TLCs), Quad-Level Cells (QLCs), and penta-level cells (PLCs) can store multiple bits per cell. In some embodiments, each of the memory devices 704 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 704 can be grouped as pages that can refer to a logical unit of the memory device used to store data. With some types of memory (e.g., NAND), pages can be grouped to form blocks.

Although non-volatile memory devices such as 3D cross point type and NAND type memory (e.g., 2D NAND, 3D NAND) are described, the memory device 704 can be based on any other type of non-volatile memory, such as Read-Only Memory (ROM), Phase Change Memory (PCM), self-selecting memory, other chalcogenide based memories, Ferroelectric Transistor Random-Access Memory (FeTRAM), Ferroelectric Random Access Memory (FeRAM), Magneto Random Access Memory (MRAM), Spin Transfer Torque (STT)-MRAM, Conductive Bridging RAM (CBRAM), Resistive Random Access Memory (RRAM), Oxide based RRAM (OxRAM), Negative-OR (NOR) flash memory, and Electrically Erasable Programmable Read-Only Memory (EEPROM).

A memory sub-system controller 715 (or controller 715 for simplicity) can communicate with the memory devices 704 to perform operations such as reading data, writing data, or erasing data at the memory devices 704 and other such operations (e.g., in response to commands scheduled on a command bus by controller 716). The controller 715 can include hardware such as one or more Integrated Circuits (ICs) and/or discrete components, a buffer memory, or a combination thereof. The hardware can include digital circuitry with dedicated (i.e., hard-coded) logic to perform the operations described herein. The controller 715 can be a microcontroller, special purpose logic circuitry (e.g., a Field Programmable Gate Array (FPGA), an Application Specific Integrated Circuit (ASIC), etc.), or another suitable processor.

The controller 715 can include a processing device 717 (e.g., microprocessor) configured to execute instructions stored in a local memory 719. In the illustrated example, the local memory 719 of the controller 715 includes an embedded memory configured to store instructions for performing various processes, operations, logic flows, and routines that control operation of the memory sub-system 710, including handling communications between the memory sub-system 710 and the host system 720.

In some embodiments, the local memory 719 can include memory registers storing memory pointers, fetched data, etc. The local memory 719 can also include Read-Only Memory (ROM) for storing micro-code. While the example memory sub-system 710 in FIG. 4 has been illustrated as including the controller 715, in another embodiment of the present disclosure, a memory sub-system 710 does not include a controller 715, and can instead rely upon external control (e.g., provided by an external host, or by a processor or controller separate from the memory sub-system).

In general, the controller 715 can receive commands or operations from the host system 720 and can convert the commands or operations into instructions or appropriate commands to achieve the desired access to the memory devices 704. The controller 715 can be responsible for other operations such as wear leveling operations, garbage collection operations, error detection and error correction code (ECC) operations (e.g., using ECC engine 152), encryption operations, caching operations, and address translations between a logical address (e.g., Logical Block Address (LBA), namespace) and a physical address (e.g., physical block address) that are associated with the memory devices 704.

The controller 715 can further include host interface circuitry to communicate with the host system 720 via the physical host interface. The host interface circuitry can convert the commands (e.g., commands 170) received from the host system into command instructions to access the memory devices 704 as well as convert responses associated with the memory devices 704 into information for the host system 720. The memory sub-system 710 can also include additional circuitry or components that are not illustrated. In some embodiments, the memory sub-system 710 can include a cache or buffer (e.g., DRAM) and address circuitry (e.g., a row decoder and a column decoder) that can receive an address from the controller 715 and decode the address to access the memory devices 704.

In some embodiments, the memory devices 704 include local media controllers 705 that operate in conjunction with memory sub-system controller 715 to execute operations on one or more memory cells of the memory devices 704. An external controller (e.g., memory sub-system controller 715) can externally manage the memory device 704 (e.g., perform media management operations on the memory device 704). In some embodiments, a memory device 704 is a managed memory device, which is a raw memory device combined with a local controller (e.g., local controller 705) for media management within the same memory device package. An example of a managed memory device is a Managed NAND (MNAND) device.

In one embodiment, the computing system 700 includes an error correction tester 714 in the memory sub-system 710 that tests operation of error correction functionality using test data and ECC data (e.g., test data 180 and ECC data 182). In some embodiments, the controller 715 in the memory sub-system 710 includes at least a portion of the error correction tester 714. In other embodiments, or in combination, the controller 716 and/or the processing device 718 in the host system 720 includes at least a portion of the error correction tester 714. For example, the controller 715, the controller 716, and/or the processing device 718 can include logic circuitry implementing the error correction tester 714. For example, the controller 715, or the processing device 718 (processor) of the host system 720, can be configured to execute instructions stored in memory for performing the operations of the error correction tester 714.

In some embodiments, the error correction tester 714 is implemented in an integrated circuit chip disposed in the memory sub-system 710. In other embodiments, the error correction tester 714 is part of an operating system of the host system 720, a device driver, or an application.

In some implementations, a communication channel between the processing device 718 and a memory sub-system 710 includes a computer network, such as a local area network, a wireless local area network, a wireless personal area network, a cellular communications network, a broadband high-speed always-connected wireless communication connection (e.g., a mobile network link); and the processing device 718 and the memory sub-system can be configured to communicate with each other using data storage management and usage commands similar to those in NVMe protocol.

A memory sub-system 710 in general can have non-volatile storage media. Examples of non-volatile storage media include memory cells formed in an integrated circuit and magnetic material coated on rigid disks. Non-volatile storage media can maintain the data/information stored therein without consuming power. Memory cells can be implemented using various memory/storage technologies, such as NAND logic gate, NOR logic gate, Phase-Change Memory (PCM), Magnetic Random Access Memory (MRAM), resistive random-access memory, cross point storage and memory devices. A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

The controller (e.g., 715) of a memory sub-system (e.g., 710) can run firmware to perform operations responsive to the communications from the processing device 718. Firmware in general is a type of computer program that provides control, monitoring and data manipulation of engineered computing devices.

Some embodiments involving the operation of the controller 715 can be implemented using computer instructions executed by the controller 715, such as the firmware of the controller 715. In some instances, hardware circuits can be used to implement at least some of the functions. The firmware can be initially stored in the non-volatile storage media, or another non-volatile device, and loaded into the volatile DRAM and/or the in-processor cache memory for execution by the controller 715.

A non-transitory computer-readable medium can be used to store instructions of the firmware of a memory sub-system (e.g., 710). When the instructions are executed by the controller 715 and/or the processing device 717, the instructions cause the controller 715 and/or the processing device 717 to perform a method discussed herein.

In one embodiment, a method (e.g., implemented in memory sub-system 710) generates and stores test data and ECC data (e.g., using ECC engine 152) as described for FIG. 1. The method can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed at least in part by the error correction tester 714 of FIG. 4.

Figure 5:
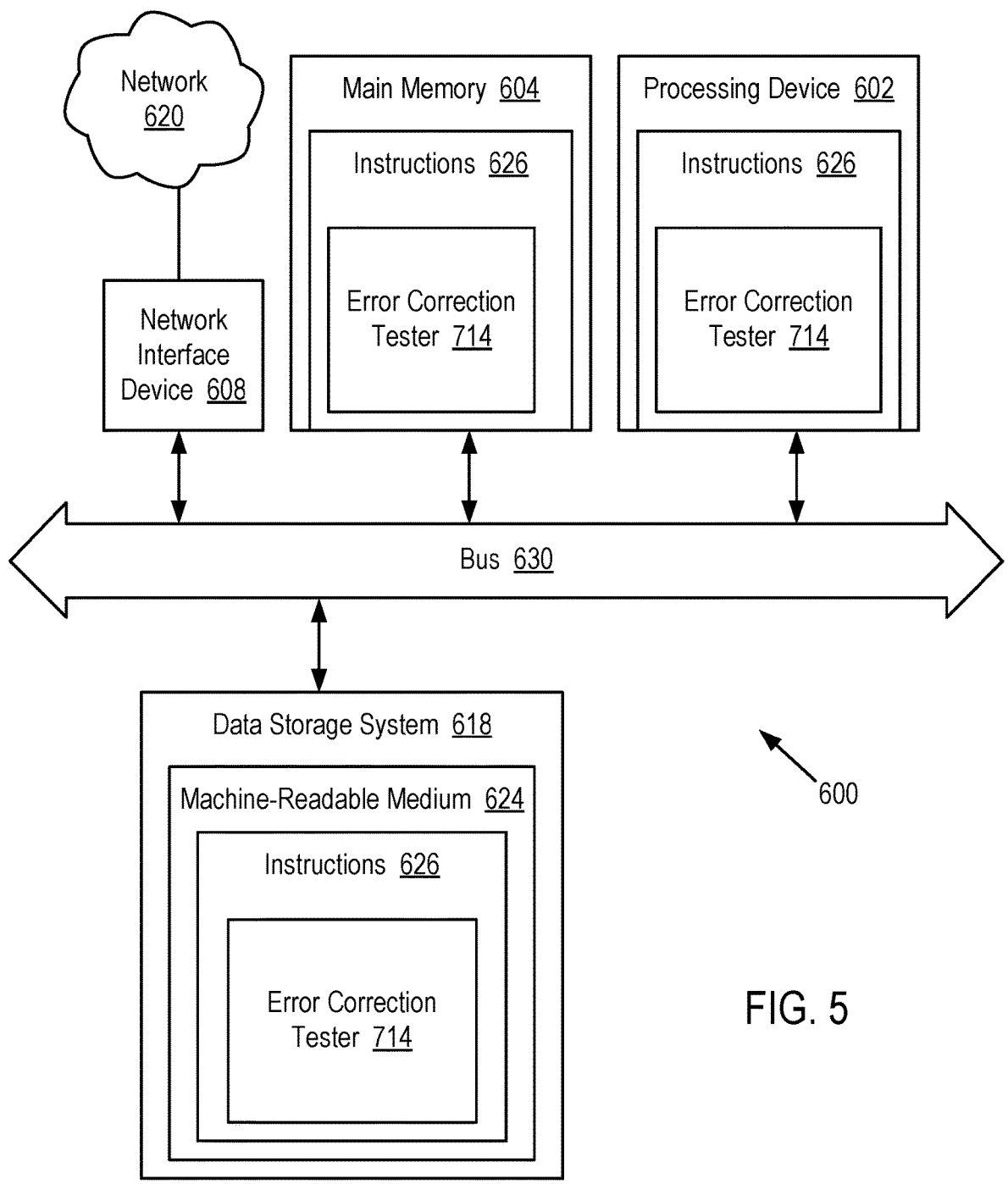
FIG. 5 is a block diagram of an example computer system in which embodiments of the present disclosure can operate.

FIG. 5 illustrates an example machine of a computer system 600 within which a set of instructions, for causing the machine to perform any one or more of the methodologies discussed herein, can be executed. In some embodiments, the computer system 600 can correspond to a host system (e.g., the host system 720 of FIG. 4) that includes, is coupled to, or utilizes a memory sub-system (e.g., the memory sub-system 710 of FIG. 4), or can be used to perform the operations of error correction tester 714 (e.g., to execute instructions to perform operations corresponding to the error correction tester 714 described with reference to FIG. 4). In one example, computer system 600 corresponds to memory device 102, and/or host device 103.

In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 618, which communicate with each other via a bus 630 (which can include multiple buses).

In various embodiments, processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also referred to as a computer-readable medium herein) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 710 of FIG. 4. In one embodiment, the instructions 626 include instructions to implement functionality corresponding to an error correction tester as described above (e.g., for testing ECC engine 152 of FIG. 1) (e.g., the error correction tester 714 described with reference to FIG. 4).

The disclosure includes various devices which perform the methods and implement the systems described above, including data processing systems which perform these methods, and computer-readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and/or operations may be described as being performed by or caused by software code to simplify description. However, those skilled in the art will recognize what is meant by such expressions is that the functions and/or operations result from execution of the code by one or more processing devices, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of computer-readable medium used to actually effect the distribution.

At least some aspects disclosed can be embodied, at least in part, in software. That is, the techniques may be carried out in a computing device or other system in response to its processing device, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions (sometimes referred to as computer programs). Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A computer-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a computer-readable medium in entirety at a particular instance of time.

Examples of computer-readable media include, but are not limited to, recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions. Other examples of computer-readable media include, but are not limited to, non-volatile embedded devices using NOR flash or NAND flash architectures. Media used in these architectures may include un-managed NAND devices and/or managed NAND devices, including, for example, eMMC, SD, CF, UFS, and SSD.

In general, a non-transitory computer-readable medium includes any mechanism that provides (e.g., stores) information in a form accessible by a computing device (e.g., a computer, mobile device, network device, personal digital assistant, manufacturing tool having a controller, any device with a set of one or more processors, etc.). A "computer-readable medium" as used herein may include a single medium or multiple media (e.g., that store one or more sets of instructions).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

In one example, a computing device is a controller of a memory system. The controller includes a processing device and memory containing instructions executed by the processing device to control various operations of the memory system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system comprising:
  memory configured to store user data for a host device;
  an error correction code (ECC) engine configured to generate error correction code (ECC) data for the stored user data, wherein the ECC data provides a capability for correcting at least one error in the user data; and
  a controller configured to:
    receive, from the host device, a command requesting at least one error to inject into stored data, wherein the command is a test command;
    in response to receiving the command, generate first data and first ECC data that correspond to the requested error, wherein the first ECC data is generated using the ECC engine;
    store the first data and first ECC data in the memory;
    read the first data and the first ECC data from the memory;
    perform, using the ECC engine, error correction for the first data read from the memory, the error correction using the first ECC data to detect the requested error;
    signal the host device to indicate detection of the requested error,
      wherein the controller is further configured to operate in a standard mode or a test mode;
      receiving a read or write command associated with user data from the host device causes the controller to operate in the standard mode; and
      receiving the test command causes the controller to operate in the test mode;
    wherein the status register is configured for access by the host device to determine:
      when in the standard mode, a status of a read or write operation for user data received from the host device; or when in the test mode, a status of at least one of storing the first data, reading the first data, or performing error correction for the first data.

2. The system of claim 1, wherein the first data is a codeword, and the requested error is at least one error injected into the codeword.

3. The system of claim 1, wherein the command is a programming operation code.

4. The system of claim 1, wherein the signaling further indicates a number of errors that are detected or corrected by the ECC engine.

5. The system of claim 1, wherein generating the first data and the first ECC data comprises:
generating the first ECC data to match second data; and
after generating the first ECC data, injecting the requested error into the second data to provide the first data.

6. The system of claim 5, wherein the second data is a codeword received from the host device.

7. The system of claim 5, wherein injecting the requested error comprises changing one or more bits of the second data so that the stored first data does not match the stored first ECC data.

8. The system of claim 1, wherein the ECC engine comprises an encoder and a decoder.

9. The system of claim 1, wherein the memory includes at least one of volatile memory or non-volatile memory.

10. The system of claim 1, wherein the controller is further configured to:
receive a write command from the host device;
store user data in the memory in response to receiving the write command;
read the user data;
perform, using the ECC engine, error correction for the user data; and
signal the host device to indicate a result from performing the error correction for the user data.

11. The system of claim 10, wherein the user data is stored in a first portion of the memory, the first data is stored in a second portion of the memory, and the second portion does not store any user data received from the host device.

12. The system of claim 1, wherein:
the memory is configured in a storage device of a vehicle; and
the storage device has an input buffer configured to receive, from a control system of the vehicle, user data for programming into the memory.

13. The system of claim 1, wherein the host device is configured to, in response to the signaling, perform at least one of disabling a location in the memory, or refreshing content of at least a portion of the memory.

14. The system of claim 1, wherein the command is a first command, and the controller is further configured to:
receive, from the host device, a second command requesting storing of second data without injecting an error;
in response to receiving the second command, generate second ECC data for the second data using the ECC engine;
store the second data and second ECC data in the memory, wherein the second data is stored without injecting an error;
read the second data and the second ECC data from the memory;
perform, using the ECC engine, error correction for the second data read from the memory, the error correction using the second ECC data; and
signal the host device regarding the error correction for the second data.

15. The system of claim 1, wherein:
the memory is configured in a memory device;
storing the first data and reading the first data emulate operations performed by the memory device in response to receiving standard program and read commands from the host device;
the standard program command is used to program user data of the host device;
the standard read command is used to read user data of the host device.

16. A system comprising:
memory;
an error correction code (ECC) engine; and
a controller configured to:
receive, from a host device, a command requesting at least one error to inject into data programmed in the memory;
in response to receiving the command, store and read first data, wherein:
storing the first data comprises generating, based on the requested error and using the ECC engine, the first data and first ECC data, and programming the first data and first ECC data in the memory; and
reading the first data comprises reading the first data and the first ECC data from the memory, and performing, using the ECC engine and the first ECC data, error correction for the first data read from the memory; and
signal the host device regarding the error correction, wherein second data is read from the memory;
error correction is performed by the ECC engine for the second data; and
a behavior of the error correction for the first data is compared to a behavior of the error correction for the second data.

17. The system of claim 16, wherein the command is only used when testing the ECC engine, the requested error is at least one calibrated error, and the first data is based on a pattern received from the host device.

18. The system of claim 16, wherein the signaling includes at least one of an interrupt signal, or an indication of an event associated with the error correction.

19. The system of claim 16, wherein the host device is configured to verify that the signaling corresponds to the requested error.

20. The system of claim 16, wherein the set of commands further includes a third command for requesting an error-free programming of second data in the memory.

21. The system of claim 16, wherein the controller is further configured to:
receive, from the host device, an address associated with the command, and data to be programmed in the memory.

22. The system of claim 21, wherein the data to be programmed in the memory is the first data.

23. The system of claim 21, wherein the data to be programmed in the memory is a pattern, and the first data is generated by modifying the pattern.

24. The system of claim 16, wherein performing the error correction for the first data comprises:
generating new ECC data from the first data read from the memory;
comparing the new ECC data with the first ECC data; and
determining whether the new ECC data and the first ECC data match.

25. A method comprising:

receiving, from a host device, a command requesting at least one error, wherein the command is a test command;

in response to receiving the command, generating first data and first ECC data that correspond to the requested error;

storing the first data and first ECC data in memory;

reading the first data and the first ECC data from the memory;

performing error correction for the first data read from the memory, the error correction using the first ECC data to detect the requested error;

signaling the host device regarding the error correction; and operating in a standard mode or a test mode;

wherein second data is read from the memory;

error correction is performed by the ECC engine for the second data; and a behavior of the error correction for the first data is compared to a behavior of the error correction for the second data.

\* \* \* \* \*